(12) United States Patent
Clinger, Jr. et al.

(10) Patent No.: US 9,345,917 B2
(45) Date of Patent: May 24, 2016

(54) QUICK OPENING INJECTION PORT (71) Applicant: DRS Power & Control Technologies, Inc., Milwaukee, WI (US)

(72) Inventors: Donald R. Clinger, Jr., Milwaukee, WI (US); Andrew J. Nerbun, Milwaukee, WI (US)

(73) Assignee: DRS Power & Control Technologies, Inc., Milwaukee, WI (US)

( * ) Notice: Subject to any disclaimer, the term of this patent is extended or adjusted under 35 U.S.C. 154(b) by 332 days.

(21) Appl. No.: 13/933,977

(22) Filed: Jul. 2, 2013

(65) Prior Publication Data
US 2015/0008233 A1 Jan. 8, 2015

(51) Int. Cl.
*A62C 3/16* (2006.01)
*H02B 1/28* (2006.01)

(52) U.S. Cl.
CPC ... *A62C 3/16* (2013.01); *H02B 1/28* (2013.01); *Y10T 29/49826* (2015.01)

(58) Field of Classification Search
CPC .............. H02B 1/28; H02B 1/26; A62C 3/16; B65D 25/00; B65D 43/0202; B65D 43/02
USPC .............. 220/315, 88.2, 88.1, 375, 601, 4.02, 220/3.8, 378, 304; 29/428; 312/409; 169/46
See application file for complete search history.

(56) References Cited

U.S. PATENT DOCUMENTS

| | | | | |
|---|---|---|---|---|
| 1,672,042 A * | 6/1928 | Schmidt | ................... | A62C 4/00 137/493.7 |
| 2,526,920 A * | 10/1950 | Wise | ................... | A62C 99/009 137/565.01 |
| 2,535,311 A | 12/1950 | McGann, Jr. | | |
| 2,637,333 A * | 5/1953 | Houston, Jr. | .......... | F16K 17/383 137/68.12 |
| 3,731,837 A * | 5/1973 | Platts | ....................... | F16J 13/08 220/315 |
| 3,948,549 A * | 4/1976 | Duran | ................... | E05B 67/365 292/26 |
| 5,511,622 A | 4/1996 | Thompson | | |
| 5,562,458 A * | 10/1996 | Stora | ...................... | H01R 43/26 439/348 |
| 6,929,073 B2 | 8/2005 | Thompson | | |

* cited by examiner

*Primary Examiner* — Robert J Hicks
(74) *Attorney, Agent, or Firm* — Kilpatrick Townsend & Stockton LLP (57) ABSTRACT

An injection port is provided for installation on an enclosure to provide quick access for admitting a fire suppressing agent into the enclosure in the event of a fire inside the enclosure. The injection port includes a housing and an injection port cover. The housing includes a mounting plate for mounting the housing to the enclosure and a pin receptacle. The injection port cover includes a cover plate and a pin release mechanism. The pin release mechanism includes a movable pin that engages with the pin receptacle of the housing to secure the injection port cover to the housing when the injection port is in the closed position.

13 Claims, 5 Drawing Sheets

QUICK OPENING INJECTION PORT

BACKGROUND

Electrical equipment used in less than ideal environments can be damaged if left unprotected from its surroundings. For example, electrical equipment on marine vessels may be susceptible to water exposure from water washed onboard or from piping leaks nearby the equipment. To protect the electrical equipment, protective enclosures can be used to provide a barrier between the equipment and its surroundings. However, housing the electrical equipment in protective enclosures also limits the accessibility to the electrical equipment. In case of an electrical fire at the equipment, the protective enclosure may hinder efforts to suppress the fire because the enclosure may obstruct access to the fire burning inside the enclosure.

One way of providing access to the electrical equipment inside an enclosure in case of a fire is to include a hinged access door on the protective enclosure. The hinged access door can be flipped opened in case of a fire to provide access to put out the fire inside the enclosure. However, if left unsecured, these access doors have a tendency to swing open when subjected to excessive shock and vibration, which may occur, for example, at rough seas. This would leave the electrical equipment vulnerable to water exposure at a time when water splashes are most likely to occur. To secure the access door from swinging open when subjected to excessive shock and vibration, the access door can be fastened shut with bolts or latches. However, doing so would require the bolts to be removed or the latches to be unlatched to open the access door in case of a fire. This can take upwards of tens of seconds to open the access door, causing significant delay before gaining access to the fire burning inside the enclosure.

Embodiments of the invention address these and other problems, individually and collectively.

BRIEF SUMMARY

Embodiments of the present invention provides an injection port that can be installed on an enclosure to provide quick access for admitting a fire suppressing agent into the enclosure in the event of a fire inside the enclosure. When in the closed position, the injection port provides a watertight and splash-proof seal to protect equipment housed inside the enclosure from water exposure. The injection port uses an interlocking pin release mechanism to secure the injection port cover to the housing of the injection port. The interlocking pin release mechanism prevents the injection port from being inadvertently opened when subjected to excessive shock and vibration. In the event of a fire inside the enclosure, the injection port can be quickly opened by a user. According to some embodiments, the injection port can be opened in less than a second.

According to various embodiments, the injection port includes a housing and an injection port cover. The housing defines an opening of the injection port. The housing can include a pin receptacle and a mounting plate for mounting the housing to the enclosure. The injection port cover is used to cover the opening of the injection port when the injection port is in the closed position. The injection port cover can include a cover plate and a pin release mechanism coupled to the cover plate. The pin release mechanism includes a movable pin that engages with the pin receptacle of the housing to secure the injection port cover to the housing when the injection port is in the closed position.

According to some embodiments, an enclosure or an electrical cabinet for housing electrical equipment includes a frame and a panel coupled to the frame. The electrical cabinet also includes an injection port provided on the panel for admitting a fire suppressing agent into the electrical cabinet in the event of a fire. The injection port includes a base that defines an opening of the injection port. The base is mounted to the panel of the electrical cabinet. The injection port also includes a removable injection port cover that forms a watertight and splash-proof seal over the opening of the injection port when the injection port is in the closed position. The injection port cover also includes a push button on the removable injection port cover that is used to open the injection port by actuating a pin release mechanism disposed on the removable injection port cover to release the removable injection port cover from the base.

According to various embodiments, a method for providing an enclosure with an injection port that is used for admitting a fire suppressing agent into the enclosure includes providing a cutout on a surface the enclosure, and mounting a housing of the injection port onto the surface of the enclosure surrounding the cutout. The housing defines an opening of the injection port, and includes a pin receptacle and a guide wall. The guide wall extends axially from the housing around the periphery of the opening and is shaped complementary to receive an injection port cover of the injection port. A compressible gasket can be provided between the housing and the injection port cover. Additionally or alternatively, a compressible gasket can be provided on a perimeter wall of the injection port cover between the injection port cover and the guide wall of the housing. A pin of a pin release mechanism disposed on the injection port cover is engaged with the pin receptacle of the housing to interlock the injection port cover with the housing. As a result, the one or more compressible gaskets are compressed to form a watertight and splash-proof seal between the injection port cover and the housing.

DETAILED DESCRIPTION

Embodiments of the present invention provide systems, devices, and methods for a quick opening injection port that can be used to admit a substance such as a fire suppressing agent into an enclosure. The injection port according to various embodiments provides a watertight and splash-proof seal to protect the equipment housed inside the enclosure from water exposure. The injection port also has an interlocking pin release mechanism that allows the injection port to be quickly opened by a user, but also prevents the injection port from being inadvertently opened when subjected to severe shock and vibration. In some embodiments, it can take less than a second for the user to open the injection port to gain access to the interior of the enclosure. In case of a fire inside the enclosure, the injection port according to various embodiments significantly reduces the amount of time it takes to gain access to the fire burning inside the enclosure.

Figure 1:
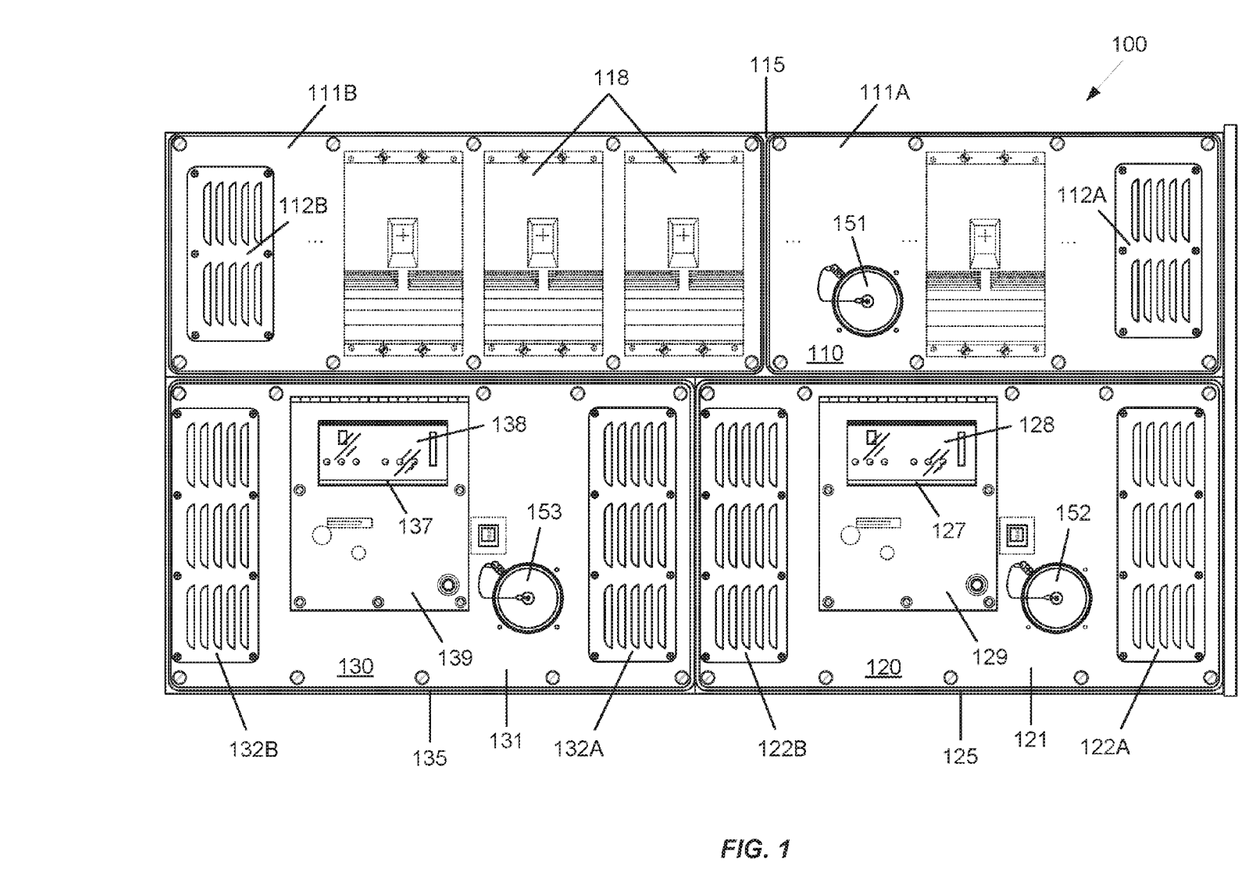
FIG. 1 illustrates an enclosure for housing electrical equipment, according to some embodiments of the present invention.

FIG. 1 illustrates an enclosure 100 used for housing electrical equipment or other sensitive equipment, according to various embodiments of the invention. Enclosure 100 can be used on marine vessels or in other environments where protection of electrical or sensitive equipment is desired. The equipment housed inside enclosure 100 can be, for example, electrical switches 118, electrical controls and displays 128 and 138, or other electrical equipment. The equipment housed inside enclosure 100 can also be high voltage equipment, or other electronics that can benefit from the protection provided by enclosure 100. Enclosure 100 can be secured to a structure of a vessel (e.g., a marine vessel), for example, by mounting enclosure 100 to the deck or a wall of the vessel.

Enclosure 100 can include multiple electrical cabinets stacked or arranged together, or can be a single electrical cabinet with one or more compartments. For example, enclosure 100 shown in FIG. 1 includes three cabinets 110, 120, and 130 arranged together to form enclosure 100. In other embodiments, enclosure 100 can have any number of cabinets or compartments. The cabinets of enclosure 100 can come in various different sizes, and each cabinet includes a frame that is designed for housing the particular equipment inside, and one or more panels secured to one or more facings of the frame. In some embodiments, the frame and the one or more panels can be formed as a one-piece construction. In some embodiments, the frame and the one or more panels can be made separately and be secured together by screws, bolts, or other fasteners as shown, or by using adhesive or welding. One or more panels of the enclosure can have ventilation ports to provide air circulation to cool the equipment housed inside the enclosure. One or more of the panels can also include a cover secured by screws, bolts, or other fasteners with a see-through portion to allow a user to view a display housed inside the enclosure. According to various embodiments, each cabinet or compartment includes at least one injection port that can be quickly opened to inject the cabinet or compartment with a substance (e.g., a fire suppressing agent in case of fire inside the cabinet).

Cabinet 110 includes a frame 115 and two panels 111A and 111B mounted to frame 115. Panels 111A and 111B include respective air ventilation ports 112A and 112B to provide air circulation for the electrical equipment housed inside cabinet 110. In the embodiment of FIG. 1, cabinet 110 houses seven electrical switches 118 (only four switches are shown for illustrative purposes) arranged in a row inside cabinet 100. Cabinet 100 also includes at least one injection port 151 to provide access to the interior of cabinet 110 in case of a fire.

Cabinet 120 includes a frame 125 and a panel 121 mounted to frame 125. Panel 121 includes two air ventilation ports 122A and 122B to provide air circulation for the electrical equipment housed inside cabinet 120, and a cover 129 with a see-through portion 127 such that the electrical equipment housed inside cabinet 120 can be seen from outside cabinet 120. In the embodiment of FIG. 1, cabinet 120 houses electrical controls and display 128. Cabinet 120 also includes at least one injection port 152 to provide access to the interior of cabinet 120 in case of a fire.

Cabinet 130 includes a frame 135 and a panel 131 mounted to frame 135. Panel 131 includes two air ventilation ports 132A and 132B to provide air circulation for the electrical equipment housed inside cabinet 130, and a cover 139 with a see-through portion 137 such the electrical equipment housed inside cabinet 130 can be seen from outside cabinet 130. In the embodiment of FIG. 1, cabinet 130 houses electrical controls and display 138. Cabinet 130 also includes at least one injection port 153 to provide access to the interior of cabinet 130 in case of a fire. It should be understood that in other embodiments, enclosure 100 can house other types of equipment and can include any number of panels, ventilation ports, covers, etc.

According to various embodiments, each injection port 151, 152, and 153 includes a housing (also referred to as a base) that is mounted to the respective cabinet 110, 120, and 130. The housing of each injection port includes an aperture to define the opening of the injection port. Each injection port includes a removable injection port cover that is used to form a watertight and splash-proof seal with the housing to cover the opening of the injection port when the injection port is in the closed position. The watertight and splash-proof seal can be achieved by using one or more gaskets (e.g., o-rings) between the injection port cover and the housing. The injection port also includes a pin release mechanism that is used to interlock the injection port cover to the housing when the injection port is in the closed position, and to allow the injection port cover to be quickly released from the housing for access to the interior of the cabinet or compartment (e.g., in the event of a fire).

In the case of a fire inside a cabinet or compartment, a user can quickly engage an actuator (e.g., a push button) provided on the injection port cover to quickly remove the injection port cover from the housing. The actuator causes movement of a pin in the pin release mechanism to disengage the injection port cover from the housing. The user can then quickly pull the injection port cover off the enclosure. According to various embodiments, engagement of the actuator and removal of the injection port cover can be performed in a seamless motion, allowing the injection port to be opened in less than a second.

Once the injection port cover is removed, a user can place the horn (or the nozzle) of a fire extinguisher canister at the opening of the injection port to inject the cabinet or compartment with a fire suppressing agent. According to some embodiments, the opening of the injection port is appropriately sized to receive the horn of a fire extinguisher canister to effectively admit the fire suppressing agent into the cabinet or compartment. The fire suppressing agent can be in the form of a gas (e.g., carbon dioxide $CO_2$, or halocarbon, etc), for example, when the enclosure is housing electrical equipment. In some embodiments, depending on the type of materials housed by the enclosure, the fire suppressing agent can alternatively be a liquid (e.g., water, or wet chemical such as potassium acetate, carbonate, or citrate, etc.), a foam (e.g., aqueous film forming foam, fluoroprotein, compressed air foam, etc.), a powder (e.g., sodium chloride, copper powder, graphite power, sodium carbonate powder, etc.), or a dry chemical (e.g., phosphate compounds, bicarbonate variants, potassium compounds, etc.). In other embodiments, other ways of admitting a fire suppressing agent into the enclosure without a fire extinguisher canister can be used. For example, water from a water hose can be injected into the injection port to suppress a fire inside the enclosure.

Figure 2:
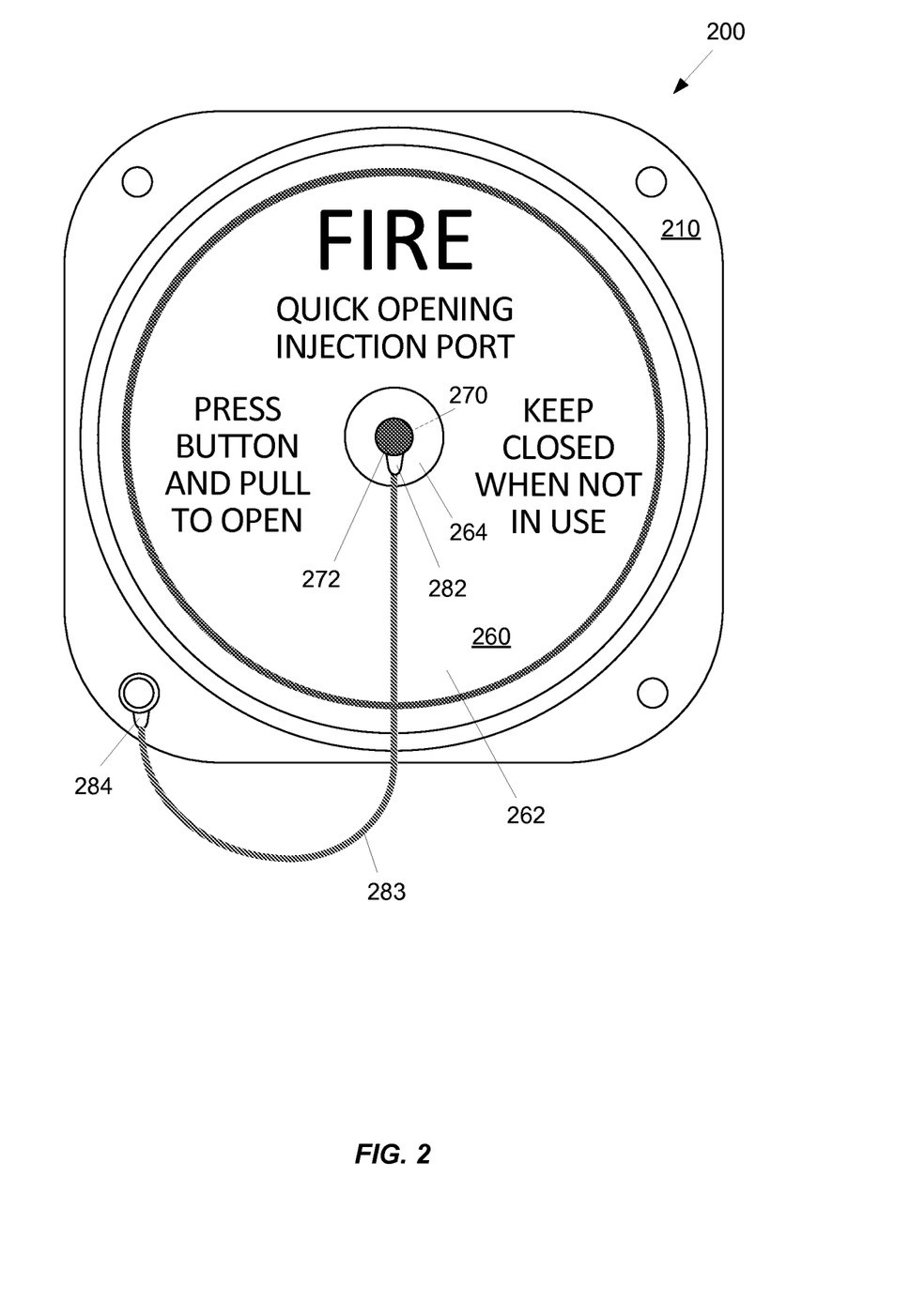
FIG. 2 illustrates a frontal view of an injection port, according to some embodiments of the present invention.

FIG. 2 illustrates a frontal view of an injection port 200 in the closed position, according to various embodiments. The frontal view shown in FIG. 2 is of a standalone injection port without an enclosure or cabinet. Injection port 200 includes a base or a housing 210 (to be describe in more detail with reference to FIG. 3) for mounting injection port 200 to an enclosure, and an injection port cover 260 for covering the opening of injection port 200 when injection port 200 is in the closed position as shown.

Injection port cover 260 includes a cover plate 262, a grip 264 that extends axially from cover plate 262, a pin release mechanism 270 coupled to cover plate 262, and an actuator 272 coupled to pin release mechanism 270. In some embodiments, cover plate 262 can be circular shaped as shown in FIG. 2. In other embodiments, cover plate 262 can take on other suitable shapes (e.g., polygons, curved or curvilinear shapes, etc.). Cover plate 262 can be made of aluminum or other suitable materials, and can be machined to shape using a lathe or a computer numerical controlled lathe machine. To indicate injection port 200 as fire suppression equipment, cover plate 262 can be anodized or be painted in a red color. Cover plate 262 can be imprinted or painted with letters (e.g., in white or other colors) describing the purpose, function, and operation of the injection port as shown. An adhesive label can also be applied to convey such information.

According to some embodiments, pin release mechanism 270 is disposed at the center of cover plate 262. Pin release mechanism 270 is used to interlock injection port cover 260 to housing 210 when injection port 200 is in the closed position, and is used to release injection port cover 260 from housing 210 when opening of injection port is desired (e.g., in the event of a fire). Positioning pin release mechanism 270 at the center of injection port cover 260 allows pin release mechanism 270 to exert a retention force that is distributed evenly across injection port cover 260 and housing 210 to form an even seal around cover plate 262 when injection port 200 is in the closed position. In other embodiments, pin release mechanism 270 can be disposed elsewhere on cover plate 262 (e.g., off-centered, near an edge of cover plate, or other suitable location).

Actuator 272 is coupled to pin release mechanism 270 to allow a user to actuate movement of a pin in pin release mechanism 270 when opening injection port 200. In some embodiments, actuator 272 can be a mechanical actuator or an electrically assisted actuator. In the embodiment as shown, actuator 272 is a mechanical push button. Depressing of push button disengages the interlocking mechanism (to be described in more detail with reference to FIG. 4) of pin release mechanism 270 from housing 210, and allows a user to quickly remove injection port cover 260 from injection port 200.

Grip 264 can be a handle that extends axially from cover plate 262, and in some embodiments, include a flanged portion as shown. Grip 264 provides a user with a structure to hold onto injection port cover 260 when opening injection port 200. Grip 264 can also be used to house portions of pin release mechanism 270 or be integrated as part of pin release mechanism 270. According to some embodiments, actuator 272 can be located at the same location as grip 264 and pin release mechanism 270 (e.g., at the center of injection port cover 260). In other embodiments, actuator 272 and/or grip 264 can be positioned at other location(s) on injection port cover 260. Placing actuator 272 at the same location as grip 264 and pin release mechanism 270 allows injection port cover 260 to be removed from housing 210 in a seamless motion with minimal force, where a user can grasp injection port cover 260 by grip 264, engage actuator 272, and pull injection port cover 260 off housing 210 while holding onto grip 264 using just one hand. Thus, according to some embodiments, placing actuator 272 at the same location as the pin release mechanism 270 may allow for a quicker opening of injection port 200 than other embodiments in which actuator 272 and/or grip 264 are disposed at other locations away from pin release mechanism 270.

In some embodiments, a grounding point 282 electrically coupled to pin release mechanism 270 is provided on cover plate 262. A ground wire 283 can be used to electrically couple pin release mechanism 270 and cover plate 262 to another grounding point 284 provided on housing 210 of injection port 200. Grounding point 284 provided on housing 210 is also electrically connected to the enclosure that injection port 200 is installed on. Ground wire 283 provides an electrical connection between the injection port cover 260 and housing 210 when injection port cover 260 is removed from housing 210. Without the electrical connection to ground, an electrical potential at injection port cover 260 and/or at housing 210 can develop. Such an electrical potential can potentially shock and cause injuries to individuals who come in physical contact with injection port 200. The ground connection provided by ground wire 283 maintains injection port cover 260 and housing 210 at ground potential to reduce the likelihood of electrical shock. Ground wire 283 can also act as a lanyard to keep the injection port cover 260 tethered to housing 210 to prevent injection port cover 260 from being misplaced when injection port cover 260 is removed.

It should be noted that because anodizing aluminum creates a non-conductive protective coating on cover plate 262, in embodiments in which cover plate 262 is anodized, the ground connection can be achieve by using external tooth lock washer to attach ground wire 283 to grounding point 282 of cover plate 262. As the external tooth lock washer is tightened to grounding point 282, the external tooth lock washer can cut through the protective coating of cover plate 262 to create an electrically conductive path. An external tooth lock washer can similarly be used for grounding point 284 of housing 210.

Figure 3:
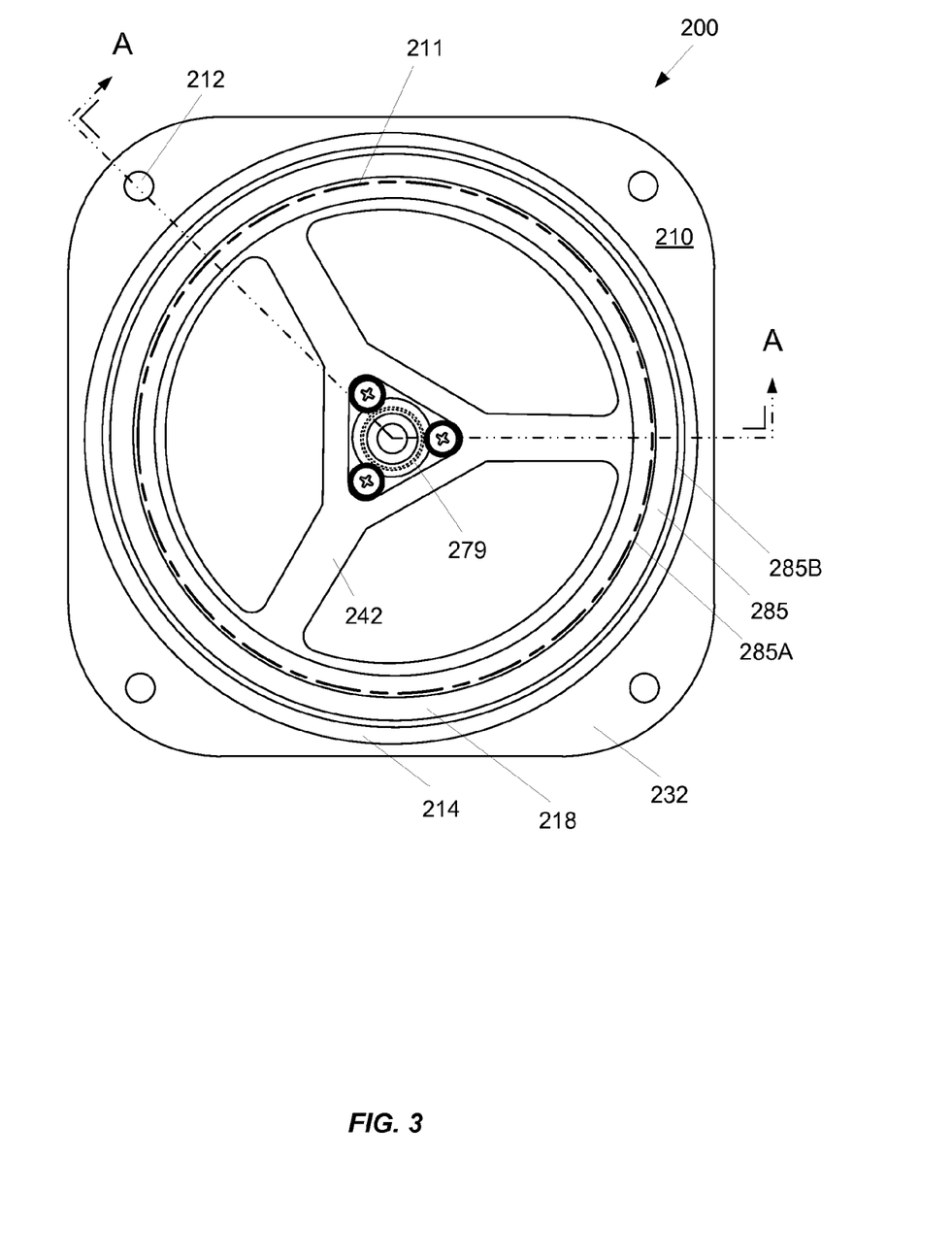
FIG. 3 illustrates a rear view of a housing of an injection port, according to some embodiments of the present invention.

FIG. 3 illustrates a rear view of a base or housing 210 of injection port 200 according to some embodiments. Housing 210 provides an aperture (shown by dotted line) that defines the opening 211 of injection port 200 through which a fire suppressing agent can be admitted. Housing 210 also includes a pin receptacle 279 that is used to interlock housing 210 with the pin release mechanism 270 of injection port cover 260. Housing 210 includes a guide wall 285 around the periphery of opening 211 of injection port 200, a mounting plate 232 around the periphery of guide wall 285, and a pin receptacle support member 242 over opening 211 of injection port 200. Housing 210 can also include one or more gasket seats (e.g., 214 and 218) to hold respective gaskets that are used to provide a watertight and splash-proof seal between housing 210 and injection port cover 260. Housing 210 can be made from aluminum billet material and be machined to shape to achieve close tolerance to the desired dimensions. Housing 210 can also be made from an aluminum casting process. The various components of housing 210 can be made together as a one-piece construction. In other embodiments, one or more components of housing 210 can be formed separately and be bonded together, for example, with a bonding agent, with fasteners, or by welding.

Opening 211 of injection port 200 defined by housing 210 can be sized similarly to the opening of the horn or nozzle of a fire extinguisher canister such that opening 211 can receive the full amount of fire suppressing agent blown from such a horn and to prevent the injected agent from flowing back out opening 211. For example, in some embodiments, opening 211 can be a circular opening as shown with a diameter between 4 and 5 inches to correspond to the size of the opening of a horn of a fire extinguisher canister. In other embodiments, opening 211 can be of other shapes and can be sized larger or smaller than the horn or nozzle of a fire extinguishing canister, although doing so may somewhat reduce the amount of fire suppressing agent injected into the enclosure.

Guide wall 285 is provided around the periphery of opening 211 of injection port 200 and extends axially from mounting plate 232. Guide wall 285 includes an interior sidewall 285A, which is the sidewall towards opening 211 of injection port 200, and an exterior sidewall 285B, which is the sidewall towards mounting plate 232. The area enclosed by interior sidewall 285A can be sized slightly larger than the horn or nozzle of a fire extinguisher canister such that guide wall 285 can act as a guide for placing the horn or nozzle of a fire extinguisher canister against opening 211 of injection port 200. Interior sidewall 285A is also shaped complementary to injection port cover 260 such that the injection port cover 260 can sit snuggly against interior sidewall 285A when injection port 200 is in the closed position. In some embodiments, guide wall 285 can extend axially outward away from the interior of the enclosure. Alternatively or additionally, guide wall 285 can also extend axially in towards the interior of the enclosure.

Mounting plate 232 around the periphery of guide wall 285 is used to secure housing 210 to an enclosure. The size and shape of mounting plate 285 can vary depending on the cutout provided on the enclosure on which injection port 200 is installed. Mounting plate 285 can include one or more mounting holes 212 to allow fasteners such as screws or bolts to be used to install housing 210 on a surface of the enclosure. Alternatively or additionally, mounting plate 285 can be secured to a surface of the enclosure using a bonding agent or by welding, etc. In some embodiments, mounting plate 285 can be mounted on the interior surface of the enclosure. Alternatively, mounting plate 285 can be mounted on the exterior surface of the enclosure.

Pin receptacle support member 242 is provided over opening 211 of injection port 200. Pin receptacle support member 242 can include one or more spokes or cross bars to provide structural support for pin receptacle 279. Pin receptacle support member 242 can also act as a stopper to prevent the horn or nozzle of a fire extinguisher canister from being inserted too far into the enclosure. In the embodiment as shown, pin receptacle support member 242 includes three spokes extending radially from the center of opening 211 of injection port 200, and pin receptacle 279 is coupled to pin receptacle support member 242 at the center of pin receptacle support member 242. The three-spoke design allows stress and compression forces exerted at pin receptacle 279 from injection port cover 260 to be evenly distributed across the housing structure while providing minimal obstruction for injecting fire suppressing agent into opening 211 of injection port 200. Other embodiments may have more than three spokes or have less than three spokes, or have other suitable structure suitable for the shape of opening 211 and for supporting pin receptacle 279. In some embodiments, a flame arresting screen 243 (shown in FIG. 4) is attached to pin receptacle support member 242 to prevent flames inside the enclosure from blowing out through injection port opening 211 when injection port 200 is opened. Flame arresting screen 243 can be made of a copper mesh material or other suitable flame arresting materials.

Figure 4:
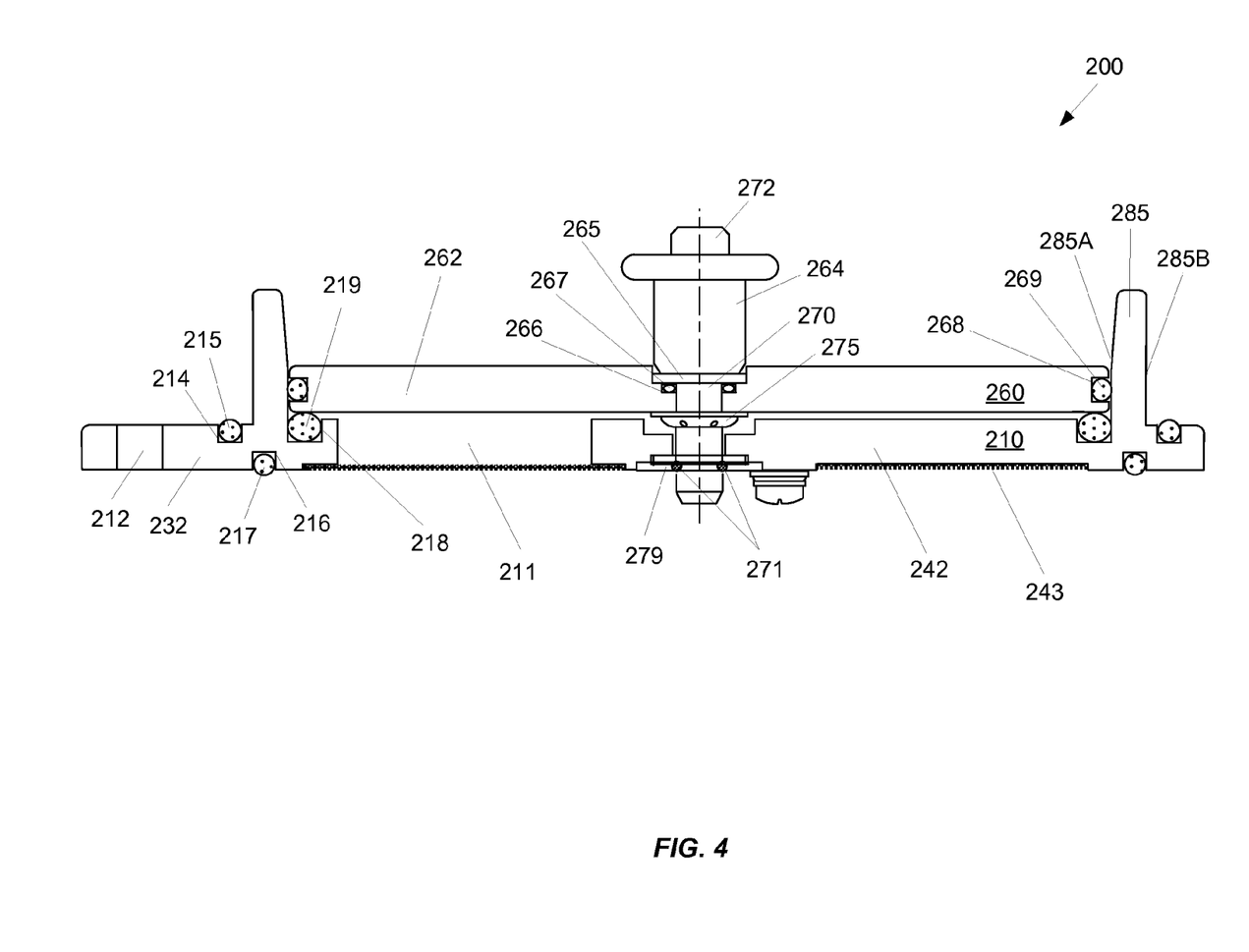
FIG. 4 illustrates a cross sectional view of an injection port, according to some embodiments of the present invention.

FIG. 4 illustrates a cross sectional view of an injection port 200 according to some embodiments. The cross-sectional view of injection port 200 shown in FIG. 4 is taken along line segments A-A of FIG. 3. Injection port 200 is illustrated with injection port cover 260 installed over opening 211 of injection port 200. In other words, FIG. 4 illustrates injection port 200 in the closed position. To prevent injection port cover 260 from coming loose when subjected to excessive or severe shock or vibration, pin release mechanism 270 disposed on injection port cover 260 extends through the inner surface of injection port cover 260 to engage with housing 210. According to some embodiments, pin release mechanism 270 includes a conduit that houses a movable pin. When injection port cover 260 is installed on housing 210 to cover injection port opening 211, the movable pin engages a set of one or more ball locks 271 (e.g., ball bearings) to push the ball locks radially outward from the conduit such that ball locks 271 are seated in a ball lock receiving region provided on pin receptacle 279 of housing 210 to interlock injection port cover 260 to pin receptacle 279. In some embodiments, the ball lock receiving region of pin receptacle 279 can be formed using a floating flatwasher with an inside diameter slightly larger than the diameter of the movable pin. Such an implementation can provide tolerances for manufacturing variations and slight misalignments. In some embodiments, the ball lock receiving region can be formed by providing one or more grooves on pin receptacle 279. The one or more grooves can be complementarily shaped to the ball locks to allow the ball locks to fit in the grooves. Pin release mechanism 270 can include a spring to provide a retention force on the movable pin when ball locks 271 are locked in placed to the ball lock receiving region of pin receptacle 279. When a user engages actuator 272 to release injection port cover 260, actuator 272 causes the movable pin to slide in the axial direction. This allows ball locks 271 to retract inside conduit to disengage pin release mechanism 270 from pin receptacle 279. For example, recessed areas can be provided on the movable pin to allow ball locks 279 to move radially inwards to fall or collapse into the conduit when the movable pin is moved axially by actuator 272. When ball locks 271 disengages with pin receptacle 279, injection port cover 260 is released from housing 210, and a user can easily pull injection port cover 260 off to remove it from housing 210.

According to some embodiments, a pin retainer 275 is provided on injection port cover 260 to retain the movable pin with injection port cover 260 when the injection port cover 260 is removed from housing 210. Injection port cover 260 may also include a washer 265 between grip 264 and cover plate 262. Washer 265 interfaces with a rim gasket 267 placed in rim gasket seat 266 around the rim of pin release mechanism 270. When injection port cover 260 is locked in the placed in the closed position, rim gasket 267 is compressed and expands radially to fill potential gaps or voids between pin release mechanism 270 and cover plate 262 to provide a watertight and splash-proof seal at the interface between pin release mechanism 270 and cover plate 262. Pin release mechanism 270 maintains even compression on rim gasket 267 by being located in the center of injection port cover 260. Compression of rim gasket 267 by clamping force exerted on cover plate 262 from pin release mechanism 270 keeps injection port cover 260 tightly closed even when subjected to excessive shock and vibration.

As mentioned above, housing 210 can also include one or more gasket seats to receive respective gaskets to provide a watertight and splash-proof seal between injection port cover 260 and housing 210. According to some embodiments, a groove structure is provided at the interface between housing 210 and the interior surface of injection port cover 260 to from a primary gasket seat 218. Primary gasket seat 218 can be part of housing 210 as shown, or be part of the cover plate 262. According to the embodiment as shown, primary gasket seat 218 is formed at the interface between pin receptacle support member 242 and interior sidewall 285A of guide wall 285. In some embodiments, primary gasket seat 218 can also partially extend into guide wall 285. In other embodiments, primary gasket seat 218 can be displaced away from guide wall 285 and be formed entirely on portions of pin receptacle support member 242 without using guide wall 285 as part of the primary gasket seat structure. A primary gasket 219 is provided in primary gasket seat 218. When injection port cover 260 is locked in the closed position, primary gasket 218 is compressed by cover plate 262 pushing against housing 210 to fill potential gaps or voids between the interior surface of cover plate 262 and housing 210.

In some embodiments, a secondary gasket seat 268 can be provided on the perimeter wall of cover plate 262 to house a secondary gasket 269. Secondary gasket 269 can be used alternatively or in addition to primary gasket 219. Secondary gasket 269 is used to seal potential gaps between the perimeter wall of cover plate 262 and interior sidewall 285A of guide wall 285 when injection port cover 260 is locked in the closed position. Thus, in embodiments that include both primary gasket 219 and secondary gasket 269, a double seal can be achieved between injection port cover 260 and housing 210 when injection port 200 is in the closed position. Even compression around the perimeter of injection port cover 260 is maintained due to the close fit of injection port cover 260 in housing 210.

According to some embodiments in which housing 210 is mounted to the exterior surface of an enclosure, a posterior gasket seat 216 can be provided at the interface between housing 210 and the exterior surface of the enclosure. Posterior gasket seat 216 can be formed on the inner surface (surface facing towards the enclosure) of mounting plate 232 around the periphery of the cutout provided on the enclosure. Posterior gasket seat 216 can be positioned below guide wall 285 as shown or be laterally displaced from guide wall 285 towards opening 211 or away from opening 211 of injection port 200 to accommodate the size of the cutout provided on the enclosure. A posterior gasket 217 placed in posterior gasket seat 216 provides a seal between housing 210 and the exterior surface of the enclosure when housing 210 is mounted to the exterior surface of the enclosure.

In embodiments in which housing 210 is mounted to the interior surface of the enclosure, an anterior gasket seat 214 can be provided at the interface between housing 210 and the interior surface of the enclosure. Anterior gasket seat 214 can be formed on the outer surface (surface facing away from the enclosure) of mounting plate 232 on the exterior sidewall side of guide wall 285. In the embodiment as shown, anterior gasket seat 214 is position adjacent to exterior sidewall 285B of guide wall 285. In other embodiments, anterior gasket seat 214 can be displaced further away from guide wall 285 to accommodate the size of the cutout provided on the enclosure such that anterior gasket seat 214 is provide around the periphery of the cutout. An anterior gasket 215 placed in anterior gasket seat 214 provides a seal between housing 210 and the interior surface of the enclosure when housing 210 is mounted to the interior surface of the enclosure.

It should be noted that in some embodiments, housing 210 can be made to include both anterior gasket seat 214 and posterior gasket seat 216 as shown such that the same housing can accommodate either type of surface mounting. When housing 210 is mounted to the enclosure, depending on which surface of the enclosure is being used as the mount surface, either anterior gasket 215 or posterior gasket 217 is used to provide a seal between housing 210 and the mounting surface of the enclosure. In other embodiments, depending on the type of surfacing mounting, housing 210 may have only one of anterior gasket seat 214 or posterior gasket seat 217.

According to various embodiments, any of the gaskets (rim gasket 267, primary gasket 219, secondary gasket 269, posterior gasket 217, and/or anterior gasket 215) used in injection port 200 can be a compressible gasket, for example, a compressible o-ring made of a high temperature resistant material such as silicone, fluorocarbon, or other suitable materials such that the gasket will not melt and stick in the event of a fire.

Figure 5:
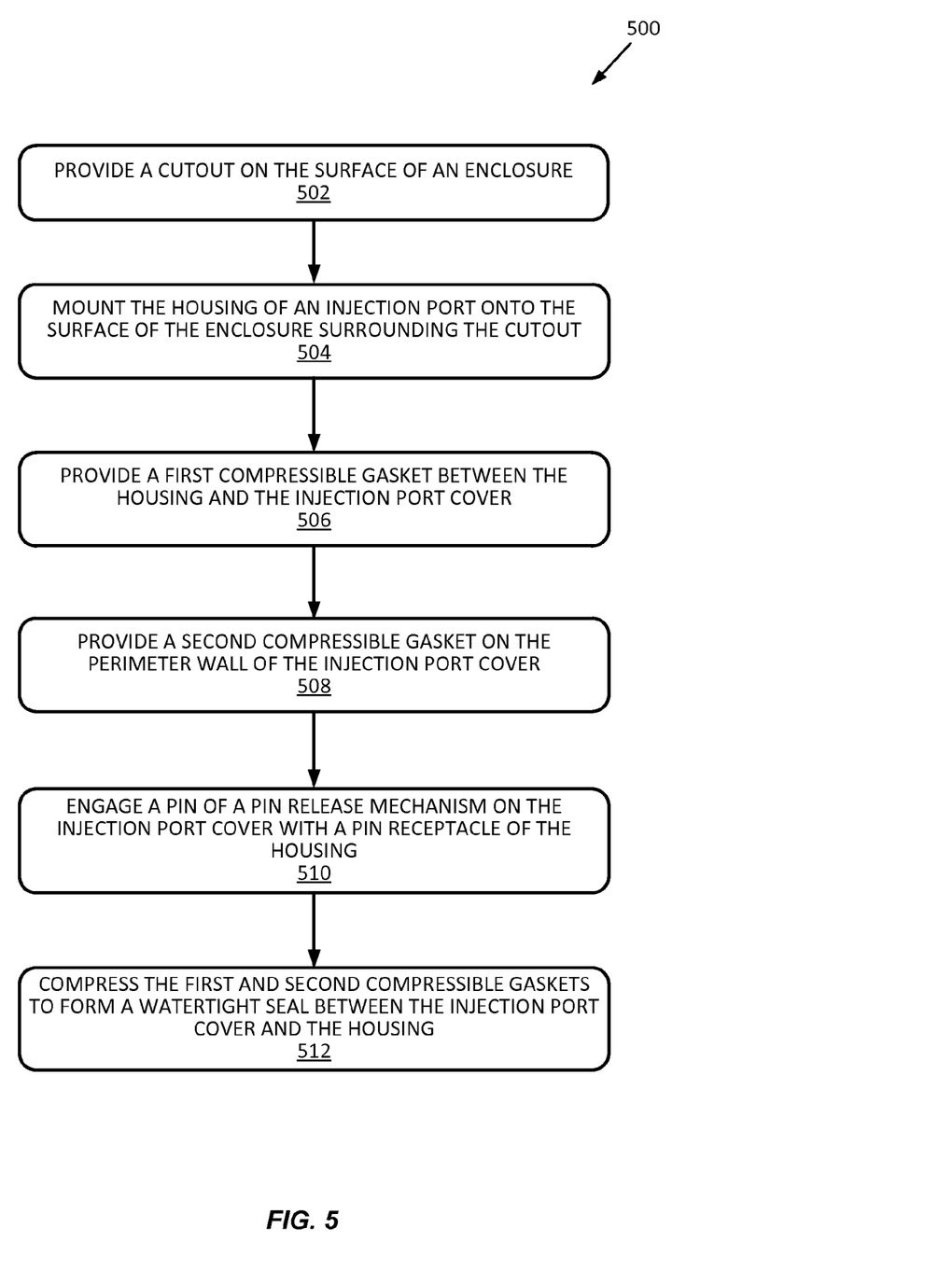
FIG. 5 illustrates a flow diagram of a process of providing an enclosure with an injection port, according to some embodiments of the invention.

FIG. 5 illustrates a flow diagram of a process 500 of providing an enclosure (e.g., an electrical cabinet or compartment) with an injection port used for admitting a fire suppressing agent into the enclosure (e.g., in the event of a fire), according to some embodiments. At block 502, a cutout is provided on a surface the enclosure. The cutout can be provided by cutting the surface of the enclosure, or the enclosure can be manufactured with such a cutout. At block 504, the housing of the injection port is mounted onto the surface of the enclosure surrounding the cutout. The housing can be mounted on the interior surface of the enclosure or on the exterior surface of the enclosure.

The housing of the injection port can be, for example, housing 210 as describe above. The housing defines an opening of the injection port through which a fire suppressing agent can be admitted. The housing includes a pin receptacle that is used to engage and interlock with a pin release mechanism provided on an injection port cover when the injection port is in the closed position. The housing also includes a guide wall that extends axially from the housing around the periphery of the opening and shaped complementary to an injection port cover of the injection port. According to some embodiments, the injection port including the injection port cover and housing can have any of the components and features as described above with reference to injection port 200.

At block 506, a first compressible gasket (e.g., primary gasket 219) is provided between the housing and the injection port cover of the injection port. Additionally or alternatively, at block 508, a second compressible gasket (e.g., secondary gasket) is provided on a perimeter wall of the injection port cover between the injection port cover and the guide wall of the housing. In some embodiments, a third compressible gasket (e.g., posterior gasket 217 or anterior gasket 215 depending on the mounting surface) is provided between the housing and the enclosure when mounting the housing of the injection port onto the surface of the enclosure. Any of the compressible gaskets can be, for example, an o-ring made of silicone, fluorocarbon, or other suitable materials.

At block 510, the pin of a pin release mechanism disposed on the injection port cover is engaged with the pin receptacle of the housing to interlock the injection port cover with the housing. The interlocking mechanism can use a set of ball locks or ball bearings as describe above. At block 512, the first and second compressible gaskets are compressed to form a watertight and splash-proof seal between the injection port cover and the housing when the pin interlocks with the pin receptacle.

According to some embodiments, the injection port includes a grip and an actuator provide on the injection port cover. In the event of a fire, a user can grasp the grip to hold onto the injection port cover, engage the actuator to actuate movement of the pin to release the pin from the pin receptacle, and pull the injection port cover off the housing. The user can then place the horn or a nozzle of a fire extinguishing canister up against the opening of the injection port and inject fire suppressing agent into the enclosure. In some embodiments, opening of the injection port can take less than a second to allow quick access to the fire inside the enclosure.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. An injection port for admitting a fire suppressing agent into an enclosure, the injection port comprising:
    a housing defining an opening of the injection port, the housing including:
        a mounting plate for mounting the housing to the enclosure; and
        a pin receptacle; and
    an injection port cover for covering the opening of the injection port when the injection port is in a closed position, the injection port cover including:
        a cover plate; and
        a pin release mechanism coupled to the cover plate, the pin release mechanism including a movable pin that engages with the pin receptacle of the housing when the injection port is in the closed position, wherein the pin receptacle includes a ball lock receiving region for engaging with one or more respective ball locks that are seated in the ball lock receiving region by the movable pin when the injection port is in the closed position.

2. The injection port of claim 1, wherein the injection port cover further includes an actuator coupled to the pin release mechanism to actuate movement of the movable pin.

3. The injection port of claim 1, wherein the ball locks retract into a conduit of the pin release mechanism when the actuator is engaged to release the injection port cover from the housing.

4. The injection port of claim 1, wherein the housing further includes a pin receptacle support member disposed over the opening of the injection port, and wherein the pin receptacle is disposed on the pin receptacle support member.

5. The injection port of claim 4, further comprising a flame arresting screen coupled to the pin receptacle support member of the housing.

6. The injection port of claim 1, wherein the housing further includes a guide wall around a periphery of the opening.

7. The injection port of claim 6, wherein a perimeter wall of the cover plate includes a gasket seat to hold a compressible gasket, the compressible gasket adapted to form a seal between the perimeter wall of the cover plate and an interior sidewall of the guide wall when the injection port is in the closed position.

8. The injection port of claim 6, wherein an interior sidewall of the guide wall is shaped complementary to a horn of a fire extinguishing canister.

9. The injection port of claim 1, wherein the housing further includes a gasket seat to hold a compressible gasket, the compressible gasket adapted to form a seal between an inner surface of the cover plate and the housing when the injection port is in the closed position.

10. The injection port of claim 1, wherein the injection port cover further includes a retainer coupled to the cover plate, the retainer for retaining the movable pin with the injection port cover when the movable pin is disengaged from the pin receptacle of the housing.

11. The injection port of claim 1, wherein the housing further includes a gasket seat formed on an outer surface of the mounting plate to hold a compressible gasket between the housing and an interior surface of the enclosure when the housing is mounted on the interior surface of the enclosure.

12. The injection port of claim 1, wherein the housing further includes a gasket seat formed on the inner surface of the mounting plate to hold a compressible gasket between the housing and an exterior surface of the enclosure when the housing is mounted on an exterior surface of the enclosure.

13. The injection port of claim 1, wherein the cover plate is circular shaped, and the pin release mechanism is disposed at a center of the circular shaped cover plate.

* * * * *